(12) United States Patent  (10) Patent No.: US 9,164,214 B2
Tininenko  (45) Date of Patent: Oct. 20, 2015

(54) MULTICOLOR FILM

(71) Applicant: Nicklas Benton Tininenko, Aspen, CO (US)

(72) Inventor: Nicklas Benton Tininenko, Aspen, CO (US)

(*) Notice: Subject to any disclaimer, the term of this patent is extended or adjusted under 35 U.S.C. 154(b) by 302 days.

(21) Appl. No.: 13/954,656

(22) Filed: Jul. 30, 2013

(65) Prior Publication Data

US 2015/0036377 A1  Feb. 5, 2015

(51) Int. Cl.
G09F 13/10  (2006.01)
F21V 8/00  (2006.01)
F21V 9/00  (2015.01)
H04N 13/04  (2006.01)

(52) U.S. Cl.
CPC ............... *G02B 6/0008* (2013.01); *F21V 9/00* (2013.01); *H04N 13/0434* (2013.01); *H04N 13/0459* (2013.01)

(58) Field of Classification Search
CPC .. G02B 6/0008; G02B 6/0076; G02B 6/0006; F21V 9/00; H04N 13/0459; H04N 13/0434
See application file for complete search history.

(56) References Cited

U.S. PATENT DOCUMENTS

| 4,497,860 | A | 2/1985 | Brady |
| 4,906,070 | A | 3/1990 | Cobb, Jr. |
| 5,056,892 | A | 10/1991 | Cobb, Jr. |
| 5,919,551 | A | 7/1999 | Cobb, Jr. |
| 5,949,346 | A | 9/1999 | Suzuki et al. |
| 6,356,389 | B1 | 3/2002 | Nilsen et al. |
| 7,040,993 | B1 * | 5/2006 | Lovitt ............................ 472/61 |
| 2006/0268387 | A1 * | 11/2006 | Lianza .......................... 359/290 |
| 2009/0293329 | A1 * | 12/2009 | Kim ................................ 40/442 |
| 2011/0088292 | A1 * | 4/2011 | Kay et al. ................... 40/124.02 |

\* cited by examiner

*Primary Examiner* — Y M Lee
(74) *Attorney, Agent, or Firm* — Mark A. Litman

(57) ABSTRACT

A system and method of providing an at least two color image with a system where the system has at least two contiguous imaged light print sheets. Each imaged light print sheet has a white light translucent sheet having a volume and a first and second print sheet having pixels within the volume which alter direction of white light transmission through the volume such that at least some light intersecting the pixel is directed towards the first viewable surface. The first and second at least two imaged light prints overlain with respective pixels of a single composite image in registry. A light emitter of a first visible color is positioned to edge-light the first imaged light print sheet and a second light emitter of a second visible color different from the first visible color, is positioned to edge light the second imaged light print sheet.

20 Claims, 13 Drawing Sheets

MULTICOLOR FILM

BACKGROUND OF THE INVENTION

1. Field of the Invention

The present invention relates to the field of color images, color image media and color image processes using light emitted into a media to provide light intensity.

2. Background of the Art

There are many imaging technologies that provide color images or color viewable material with the light energy illuminating, highlighting or energizing distributed image content. The simplest such image displays are arrays of lights in patterns (especially of colors) that provide an image when viewed from an appropriate distance. Shaped neon light displays are an example of that technology. Motion pictures and slide shows are merely reflective surfaces onto which patterns of colors are projected and reflected off the surfaces for viewing. Cathode ray tubes are distributions of phosphors that emit specific wavelengths of light when irradiated (e.g., with electron beams) such that when a screen containing arrays of phosphors is irradiated in predetermined patterns, individual patterns of colors combine to form a relatively full color image that is emitted from the screen.

U.S. Pat. No. 4,497,860 (Brady) describes sheet articles having on one surface thereof a linear prism array and a diffraction grating on the opposite surface. These arrays of prisms are deformable and the sheet articles are suitable for the preparation of projection transparencies. By local deformation of the prism, the transmittance properties of the sheet articles are altered, providing differentiation in image density with transmitted (e.g., from back lighting) light.

U.S. Pat. Nos. 4,906,070 and 5,056,892 (Cobb) describes a thin, flexible film made of a transparent polymeric material including a structured surface and an opposite smooth surface, wherein light striking either surface, within certain angular ranges, is totally internally reflected. The structured surface includes a linear array of miniature, substantially right-angled isosceles prisms arranged side-by-side to form a plurality of peaks and grooves. In addition, the perpendicular sides of the prisms make an angle of approximately 45° with the smooth surface, and when the film is curled the smooth surface lies in a smooth continuous arcuate curve without materially affecting the performance of the film. Because of the film's flexibility and its ability to totally internally reflect light, it may be utilized in a variety of ways, for example, as a collector of solar energy or as a light conduit. The performance of the film may be manipulated to permit controlled light leakage.

U.S. Pat. No. 5,919,551 (Cobb et L.) describes a structured optical film with variable pitch peaks and/or grooves to reduce the visibility of moire interference patterns and optical displays incorporating one or more layers of the film. The pitch variations can be over groups of adjacent peaks and/or valleys or between adjacent pairs of peaks and/or valleys.

U.S. Pat. No. 5,949,346 (Suzuki) describes an LED display device with an indicator having a housing. The housing has at least one incident portion that receives light from at least one LED. The incident portion has a reflection surface at its inside surface. LEDs emit light from one side or one longitudinal end of the incident portion. A refraction-plate may be provided to direct emission of the incident light for viewing by a user.

U.S. Pat. No. 6,356,389 (Nilsen et al.) describes a light collimating film having a first side and a second side, wherein the first side includes a series of prisms, and the second side includes a plurality of sub-wavelength optical microstructures. Another embodiment includes a back-lighting display device having a lighting means, a display print, and a sheeting having a first side and a second side, wherein the first side includes a series of prisms, and the second side includes a plurality of sub-wavelength optical microstructures. A preferred embodiment includes a back-lighting display device having a collimating film with a first surface having a sub-wavelength optical microstructure thereon and a second surface with linear prisms having an included angle of greater than about 95°, and a second collimating film having a first surface with a sub-wavelength optical microstructure thereon and a second surface with linear prisms having an included angle of less than about 85°.

Alternative imaging structures and technology are still desired. All disclosures cited in this patent are incorporated in their entirety herein.

SUMMARY OF THE INVENTION

Images with color capability are provided using an additive-color-producing process. At least two different color forming layers are combined to provide at least two color components. In an additive color process, it is typical to use at least three color components comprising, or selected from, the group consisting of red, blue and green, although for specialty images, as may be used in art displays, advertising and public announcements, different combinations of colors may be used. The at least two colors are preferably provided as at least two distinct overlain sheets, each sheet providing at least one, and preferably only one of the at least two colors. The at least two layers are provided with planned, predetermined, patterned or image-wise distributed light-dispersing, light-diffracting, light-refracting or light-reflecting content within at least one of the overlain sheets or penetrating from a surface of the overlain sheet into the volume of the overlain sheet. Light of a color that is to be provided in a final image is fed from the side of the sheet with the content therein, and the path of that light is altered by the content so that it is viewable on the surface of the sheet(s).

DETAILED DESCRIPTION OF THE INVENTION

Figure 1:
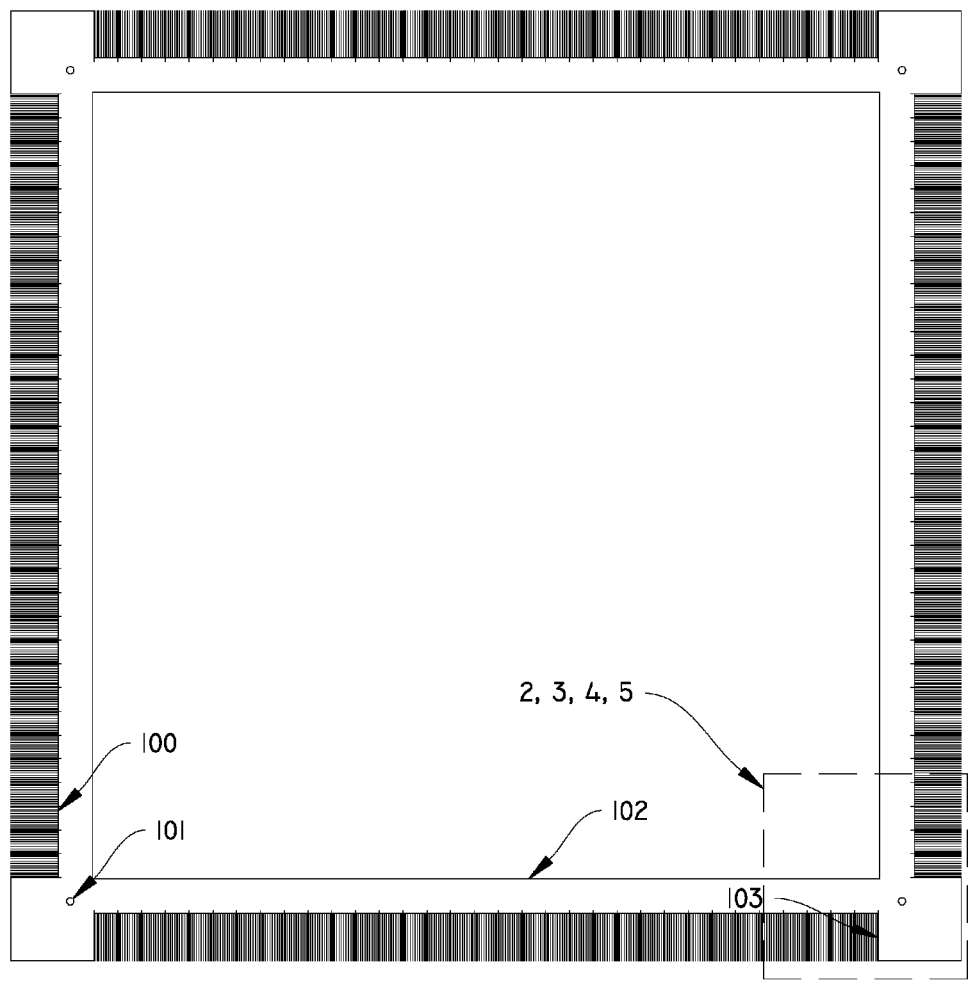
FIG. 1 shows the individual fiber strands in a lightprint sheet of the present technology before they have been bundled. There is a registration hole adjacent the edge of the sheet. The boundary of the lightprint sheet is also shown.

Images with color capability are provided using an additive-color producing process. An additive color model involves light emitted directly from a source or illuminant of some sort. The additive reproduction process usually uses red, green and blue light to produce the other colors, although for specialty images, as may be used in art displays, advertising and public announcements, different combinations of colors may be used. Combining one of these additive primary colors with another in equal amounts produces the additive secondary colors cyan, magenta, and yellow. Combining all three primary lights (colors) in equal intensities produces white. Varying the luminosity of each light (color) eventually reveals the full gamut of those three lights (colors).

Although the preferred embodiment of this technology is to provide the three primary colors enabling a relatively full spectrum range of colors, because the underlying light transmitting/dispensing sheets are, or can be, or should be, color-free and transparent, any color light can be used on individual sheets (e.g., yellow, orange, pink, chartreuse, teal, purple, etc.) to provide unique display effects. Each individual sheet (referred to herein as a light print sheet) basically comprises a light transmitting (preferably white light transparent) sheet, that is transmissive of at least 410 nm to 780 nm wavelengths of light, inclusive. The light print sheet may comprise polymeric sheet or film material, glass, quartz or any other transparent material. Preferred polymers include acrylic polymers (acrylates and methacrylates and copolymers thereof), polyolefin polymers (e.g., polyethylene, polypropylene and copolymers thereof), polyvinyl resins, polystyrene (and copolymers), polyurethanes, polysiloxanes and other silicone polymers and copolymers. The higher the degree, or percentage, of transmission of the wavelength of light being transmitted through that particular layer, the greater the efficiency of the system, so that individual layers may be optimized with respect to individual color light to be transmitted through the layer.

The light print sheets described herein comprise sheet or film material having an edge into which light may be transmitted and thereby carried through the major volume of the sheet or film. For example, if the light print sheet is a rectangular sheet having a length, width and depth, the light is preferably projected, injected or shown into a side of the sheet defined by the width and depth or the length and depth. In this manner, the light is carried through the major volume of the light print sheet. If there were no modification of the light-transmitting properties or internal and/or surface characteristics of the light print sheets, projection of light into the sheets would have little substantive functionality. The composition of the sheet might disperse some of the projected light or imperfect internal reflection might allow some escape of the light, producing a modest coloration to the sheet. This would be of only modest utility. The present technology adds substantive functionality and utility to the light print sheets by altering the length-wise and/or width-wise light transmitting properties within the light print sheets.

The individual light print sheets are modified by various available techniques (later described and defined herein) that modify at least some light transmission properties along the internal length and/or the internal width of the light print sheets. Any such modification may include, but is not necessarily limited to, light dispersion influences, light reflecting influences, light refraction influences and the like. As an example, light-dispersion influences will be discussed first, with an understanding that other light-effecting modifications may also be used in similar manners. In a glass or polymer sheet, technology is commercially available for electro-chemical, laser or ion etching of the transparent materials to alter diffusive or refractive properties of the light-transmissive material. This is done most commonly in forming holographic images or forming light gates or lamellar gratings in the film. Each of these techniques produces an intended pattern, distribution, order, image or orientation of locations where the essentially perfect (or optimal) light transmission properties of the film have been modified to cause light that impacts that modified space (a line, a dot, a pixel, a volume, a pattern, etc.) to be directionally altered (e.g., dispersed, refracted or reflected). This localized directional change of the light transmission properties within the sheet shall be referred to as pixel creation in terms of the present technology, as the change effectively creates at least a pixel for use in the processes described herein. This pixel must somehow impact or be within the interior volume of the light print sheet. For example, the pixel may begin at the surface of the sheet and extend into the volume of the sheet or may be completely within the volume of the sheet. The pixel may begin at either a relative top surface or relative bottom surface of the sheet and pass partly or completely into and through the depth of the light print sheet. One effect of the pixel is to cause light being transmitted through the width and/or length of the sheet to have its direction altered so that it is emitted through at least one of the surfaces of the light print sheet formed by the width and length of the light print sheet. The shape and structure of the pixel may also be altered or designed (as later described herein) to assist in intensifying the emission of the light through a relatively top or front viewing surface of the light print sheet and the image displaying article formed by one or more light print sheets. For example, as the direction of light refraction when light passes across an interface (e.g., between the transparent material and the modified transparent material), the greater amount of refracted light may be directed towards the viewing surface of the light print sheet.

Once the pixels have been created in the light print sheet (herein referred to as an "imaged light print sheet"), the injection or shining of light through the volume of the imaged light print sheet will cause the pixels to change the direction of the light where the pixels are struck by the light, and that light will be dispersed, at least in part towards the viewing surface. What is most critical to appreciate is that, as the light print sheet may be completely or essentially visible color neutral (transmission is equal for each and every visible wavelength within white light, any color may be injected or projected into the imaged light print and that color will be seen on the viewable surface of the image viewable device. If there are at least three light print layers, a relatively full spectrum composite may be formed by having green, blue and red light injected/projected into three distinct light print layers sequentially overlying one another. With the pixels in image-oriented registry, the final image may provide not only green, blue and red images pixels, but the additive light may form a relatively full spectrum of visible colors as is known to those skilled in the imaging arts. Equal positive intensity from three imagewise viewed (e.g., vertical or horizontal) aligned pixels would provide a white pixel, and zero intensity from three vertically aligned pixels would produce a black (no light) pixel.

The use of three sequentially overlying sheets (with the pixels in effective registry according to any composite image collectively in the at least three sheets) effectively reproduces or provides three color (e.g., red, green and blue) separation sheets. The individual sheets, or all of the sheets at the same time, or in sequence, or staggered, are edge lit, as with LED light, laser light, fiber optic transmitted light, piped light and the like and from one or more viewing surfaces (it could be a two-way viewable image system, such as a print with the same image displayed on the front and back of the light print) the image provided by the pixels can be viewed. The light print sheet acts as a wave guide for the light, with the transmission of the light altered by the pixels, and the alteration or interference of the pixel causing a color pixel to be viewable at the viewing surface(s). The pixel "glows" with the color of light moving through that layer, and with the three layers in registry, the composite viewed image can have a relatively full spectrum capability. The layers may be separately imaged (the imagewise distribution of pixels formed independently and separately for each color separation light print sheet, or by tightly focused laser imaging exposure forming the pixels, the three layers may be overlain, and the pixel images exposed and formed in each of the three layers while they are contiguous. Registry marks may be provided on the individual light print sheets to assist in aligning the sheets together. If the light print sheets are to be combined in a frame, physical registry elements, such as a notch(es), or a hole(s), may be provided on the individual sheets and posts provided in a final frame or support for the three color separation light print sheets to assist in their registry. The notches, or holes, may also differentiate among the three light print sheets to assure that the sheets are positioned in a desired order. Although the ordering of red, green and blue color separation sheets is not ordinarily critical, designers are prone to desire consistency, so the assistance in the ordering of registered sheets can be commercially desirable.

The light may be piped into individual films through optical fibers or other guided systems (e.g, LEDS having focusing shutters, or shields, or lasers being directed through coupling prisms, that direct light into a single one of the multiple films). Once the light is within a film, it tends to be directed through that film by internal reflection or, if properly angled by total internal reflection. Optical fibers may be fused or adhesively secured to direct the light through the film, parallel to the major surfaces of the film. Although the use of three films for the three primary colors is a basic and useful structure, there are variations in the technology that can expand upon this fundamental use of the technology.

By using multiple layers or multiple sets of layers (e.g., twelve layers of consecutively ordered red, green and blue), depth (3-dimensional effects) can be displayed on the system, and even repeated motion displays (e.g., a head nodding, a dog wagging its tail, or any other 3-4 position movement). By timing the lighting of the respective layers, observable motion can be effectively displayed. By focusing light on the multiple layers at the same time, and by adding perspective to the pixels, a 3-dimensional appearance may be provided. By adding optical two-direction perspective to the pixels and using filtering lenses or eyeglasses, a 3-dimensional view can be provided (as was done with early off-set 3-dimensional comic books).

The light should be piped in with good alignment with the individual layers. Where optical fibers are used, for example, the fibers should be securely aligned with the thin edges of each film. The securement may use a frame adhered to the edges through which the fibers first pass. The securement through a frame will prevent jostling or minor contact with the optical fibers from moving the optical fibers out of alignment and reducing the quality of the image. By having a continuous array of parallel fibers secured side-by-side with each other, additional stabilization or primary stabilization can be provided.

The parameters available for use with the present technology are limited only by intended use (e.g., small images would use higher resolution, smaller pixels, smaller spacing, etc.) as compared to larger images where larger pixels, greater spacing and farther viewing distances are involved. The numerical descriptions used in the following discussion therefore are exemplary, and only where the limits are recited in claims are the values intended to specifically limit any claim, the numbers otherwise being exemplary and descriptive. For example, large road signs may have pixels on the order of centimeters (e.g., 0.05 to 5 centimeters), while displayed fine art may desirably have at least 25 line pairs per centimeter (lpc) or at least 50 lpc, or at least 75 lpc, or at least 100 or 150 lpc to provide an image of relatively high resolution. Where the surface is actually etched to produce the pixel, the etch depth should be deep enough to provide some minimum desired level of light direction alteration and surface emission of light from the light print sheet. In higher resolution light print sheets, where lasers (e.g., excimer lasers, $CO_2$ lasers, YAG lasers and the like) are utilized to produce the light-influencing pixel, the etch depth may be (again by way of non-limiting examples) from about 1 to 200 microns, but preferably not entirely through the depth of the light print sheet, especially where the sheets have been exposed while multiple sheets are in a contiguous relationship. It is possible for the dimensions to be larger in large area (e.g., billboard) images and, depending upon the light intensity needed for visual acuity and reading by humans or mechanical reading by sensors, the depth of the etch, dimensions of the pixel and resultant light intensity may vary significantly, even outside these parameters.

The shape, content and degree of alteration of the transmission properties of the pixels can be controlled according to various techniques and commercially available process technology known in the art and referred to herein. The present disclosure will not duplicate the entire extent of knowledge within the skill of the ordinary artisan, such as polymer chemistry, film-forming processes and how lasers work, how laser holography works, and the like, as that is already understood by those skilled in the art. The unique aspects of the present disclosure include the use of those known technologies, in the manner enabled herein, to affect the materials and processes of the present technology.

Various aspects of the present technology includes a method of viewing an image having multiple colors therein comprising overlaying at least two imaged light print sheets; wherein each imaged light print sheet may have a white light transparent sheet having a length, width and depth, and a first viewable surface defined by the width and length and a second surface opposed to the viewable surface defined by the width and length; the length, width and depth of the imaged light print defining a volume; a first of the at least two imaged light print sheets having pixels within the volume which alter direction of white light transmission through the volume such that at least some light intersecting the pixel is directed towards the first viewable surface; a second of the at least two imaged light print sheets having pixels within the volume which alter direction of white light transmission through the volume such that at least some light intersecting the pixel is directed towards the first viewable surface; the first and second of at least two imaged light prints overlain in a continuous manner; wherein a light of a first visible color edge-lights the first of the at least two imaged light print sheets and a second light, of a second visible color different from the first visible color, edge lights the second of the at least two imaged light print sheets. The method may have further steps of overlaying a third imaged light print sheet with the at least two imaged light print sheets forming a three-sheet, tri-color array; the third imaged light print sheet having pixels within the volume which alter direction of white light transmission through the volume such that at least some light intersecting the pixel is directed towards the first viewable surface; and the first, second and third imaged light prints are positioned in a continuous manner; wherein a light of a first visible color edge-lights the first of the at least two imaged light print sheets, a second light, of a second visible color different from the first visible color edge, lights the second of the at least two imaged light print sheets, and a third light, of a third visible color different from the first and second visible colors, edge lights the third imaged light print sheet.

The at least two three-sheet tri-color arrays are fixed together in a vertical array, each layer having edge-lights thereon and the edge lights may preferably be arrays of optical fibers. The edge lights for each layer may be provided with single color light sources, such as filtered light, LED light or the single color light sources may be a monochromatic light, such as a laser. The edge-lights may be either continuously lit to provide a 3-dimensional effect or each three-sheet, tri-color array may be separately lit to provide a visual effect of image movement or change.

As a working prophetic example, an example of an optically clear (at least 90% transmissive of all wavelengths in the visible spectrum between 410 and 780 nm) polyethylene film (e.g. biaxially-oriented polyethylene terephthalate) will be used as the example of a light print sheet. Such films are readily manufactured and commercially available. The film used in the examples described herein will have a thickness of 1 mil (0.0254 mm) as that is sufficiently thick as to be machine and manually transportable. Either thinner or thicker sheets may be used. A first sheet (designated herein as the red separation sheet) is laser marked by a 532 nm fiber laser having 1260 dots per inch (500 dots per cm) resolution. The fluence of irradiation is focused and applied to mark individual pixels having depths of from 0.002 to 0.010 mm to control effective pixel density. The greater the depth of the mark, the greater the amount of light dispersed. The mark is focused to provide pixels having 45° slopes into the exposed surface of the sheet. The shape of the pixels are truncated pyramids with the exposed truncated face equaling the depth of the etch (e.g., 0.002 to 0.010 mm). The pattern of the mark was selected as the binary bitmap of a dithered grayscale of a red color separation for a halftone, free-domain (not copyrighted) image. The halftone image pattern is preferentially produced with a stochastic (frequency modulated) screen, as known to those in the printing arts. The polyethylene sheet was imaged and placed on a frame support.

A substantially identical process was repeated twice, separately using a binary bitmap of a dithered grayscale of a blue color separation for the same halftone, free-domain (not copyrighted) image and a binary bitmap of a dithered grayscale of a green color separation for the halftone, free-domain (not copyrighted) image. The three imaged light print sheets were aligned in registry within a frame having LED emitters embedded in the sides of the frame, extending approximately the length of the side of the frame and aligned with the edges of the three imaged light print sheets. One line of LED emitters was blue and was aligned with the blue color separation light print sheet. A second line of LED emitters emitted green light and was aligned with the edges of the imaged green color separation light print sheet. The third line of LED emitters emitted red light and was aligned with the red imaged color separation light print sheet. Upon activation of the individual lines of the LED emitters, the respective color separation for each imaged light print sheet could be viewed of the halftone, free-domain (not copyrighted) image. Upon activation of all three LED emitters at equivalent, predetermined intensity, a relatively full-spectrum, free-domain (not copyrighted) image was viewed.

If the LED light colors had been replaced with different colors, the color balance of the viewed image would have been shifted, as the imaged light print sheets do not have any inherent color content. The color balance of the image may also be adjusted by varying the relative brightness of each individual light source. Laser light carried to the sides of the imaged light print sheets could have also been used. The light may be emitted continually, at timed intervals, or even at frequencies undetectable by the eye (e.g., >30 Hz) to provide an apparently constant image.

At least three different color forming layers are combined to provide the at least three color components. In an additive color process, it is typical that the at least three color components comprise, or are selected from, the additive primary group consisting of red, blue and green. Additionally, other layers of different colors (such as yellow) may be added to increase the color gamut of the image reproduction. The three colors are preferably provided as three distinct overlain sheets, each sheet providing at least one, and preferably only one, of the at least three colors. The three layers are provided with planned, predetermined, patterned or image-wise distributed light-dispersing, light-diffracting, light-refracting or light-reflecting content within at least one of the overlain sheets or penetrating from a surface of an overlain sheet into the volume of the overlain sheet. Light of a color that is to be provided in a final image is fed from the side of the imaged light print sheet with the content therein, and the path of that light is altered by the content so that it is viewable from the surface of the sheet(s).

DETAILED DESCRIPTION OF THE FIGURES

FIG. 1 shows the individual fiber strands 100 in a lightprint sheet of the present technology before they have been bundled. There is a registration hole 101 adjacent the edge of the sheet 102. The boundary of the lightprint sheet 103 is also shown.

Figure 2:
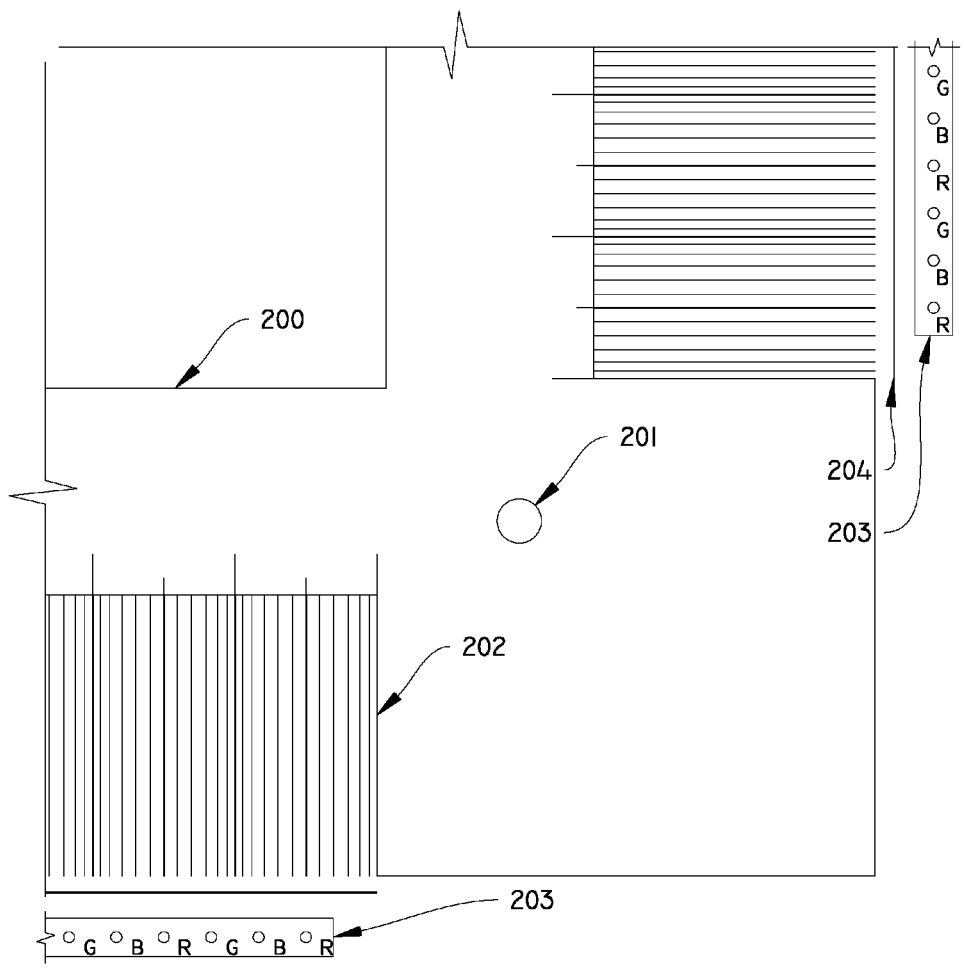
FIG. 2 shows four separate sections of a lightprint sheet, with one boundary of an image area, a registration hole, individual; fiber strands before bundling, alternating red (R), green (G) and blue (B) light emitting diode (LED) light strip with individual DMX control channel circuits per color, and an edge view of the individual fiber strands.

FIG. 2 shows four separate sections of a lightprint sheet, with one boundary of an image area 200, a registration hole 201, individual; fiber strands 202 before bundling, alternating red (R), green (G) and blue (B) light emitting diode (LED) light strip 203 with individual DMX control channel circuits per color, and an edge view 204 of the individual fiber strands.

Figure 3:
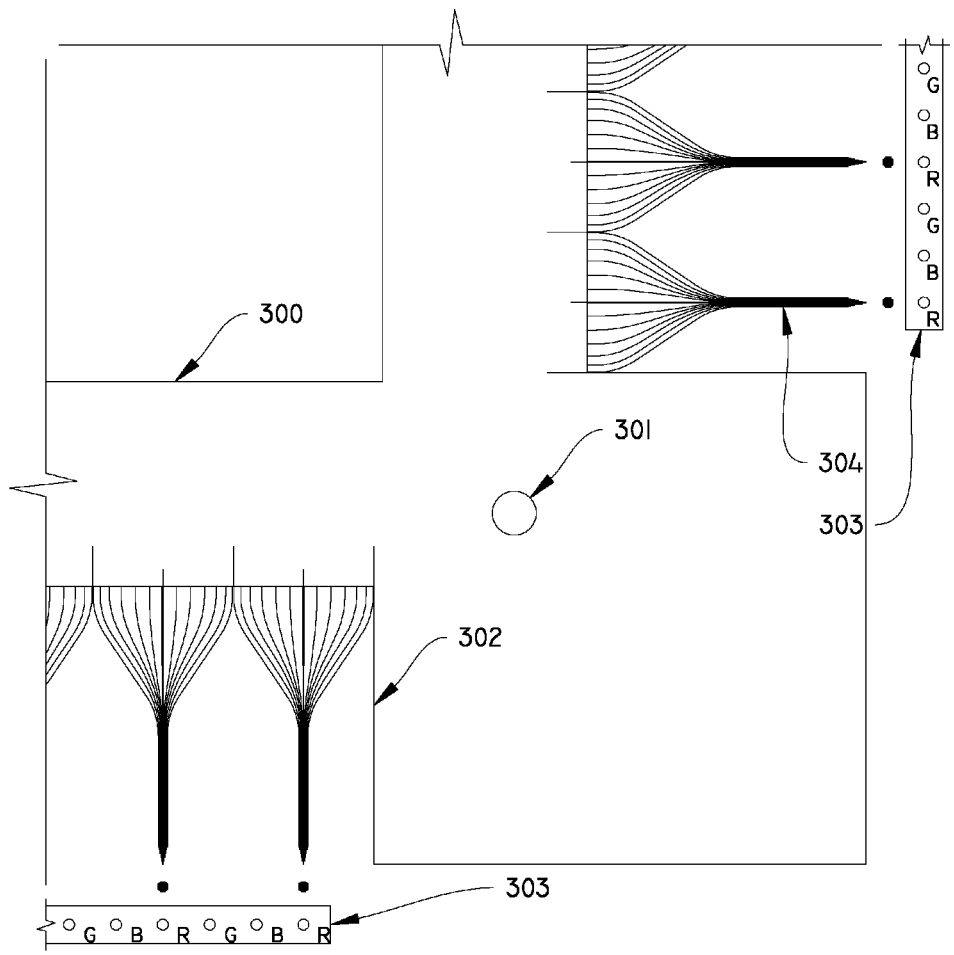
FIG. 3 shows the boundary of an image area, a registration hole, an edge of the sheet bounding individual fiber strands, alternating red (R), green (G) and blue (B) light emitting diode (LED) light strip with individual DMX control channel circuits per color, and individual fibers strands bundled together.

FIG. 3 shows the boundary of an image area 300, a registration hole 301, an edge 302 of the sheet bounding individual fiber strands, alternating red (R), green (G) and blue (B) light emitting diode (LED) light strip 303 with individual DMX control channel circuits per color, and individual fibers strands 304 bundled together.

Figure 4:
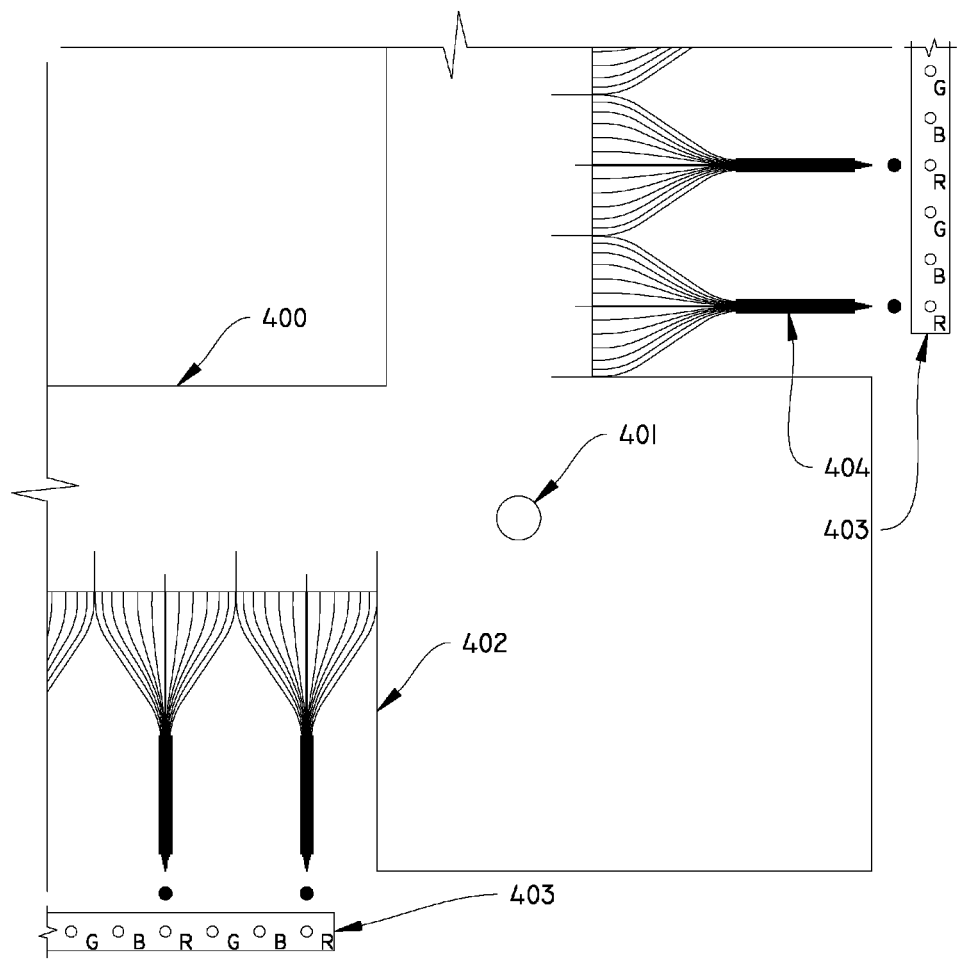
FIG. 4 shows another boundary of an image area, a registration hole, an edge of the sheet bounding individual fiber strands, alternating red (R), green (G) and blue (B) light emitting diode (LED) light strip with individual DMX control channel circuits per color, and cladding encompassing individual fiber strands.

FIG. 4 shows another boundary of an image area 400, a registration hole 401, an edge of the sheet 402 bounding individual fiber strands, alternating red (R), green (G) and blue (B) light emitting diode (LED) light strip 403 with individual DMX control channel circuits per color, and cladding 404 encompassing individual fiber strands.

Figure 5:
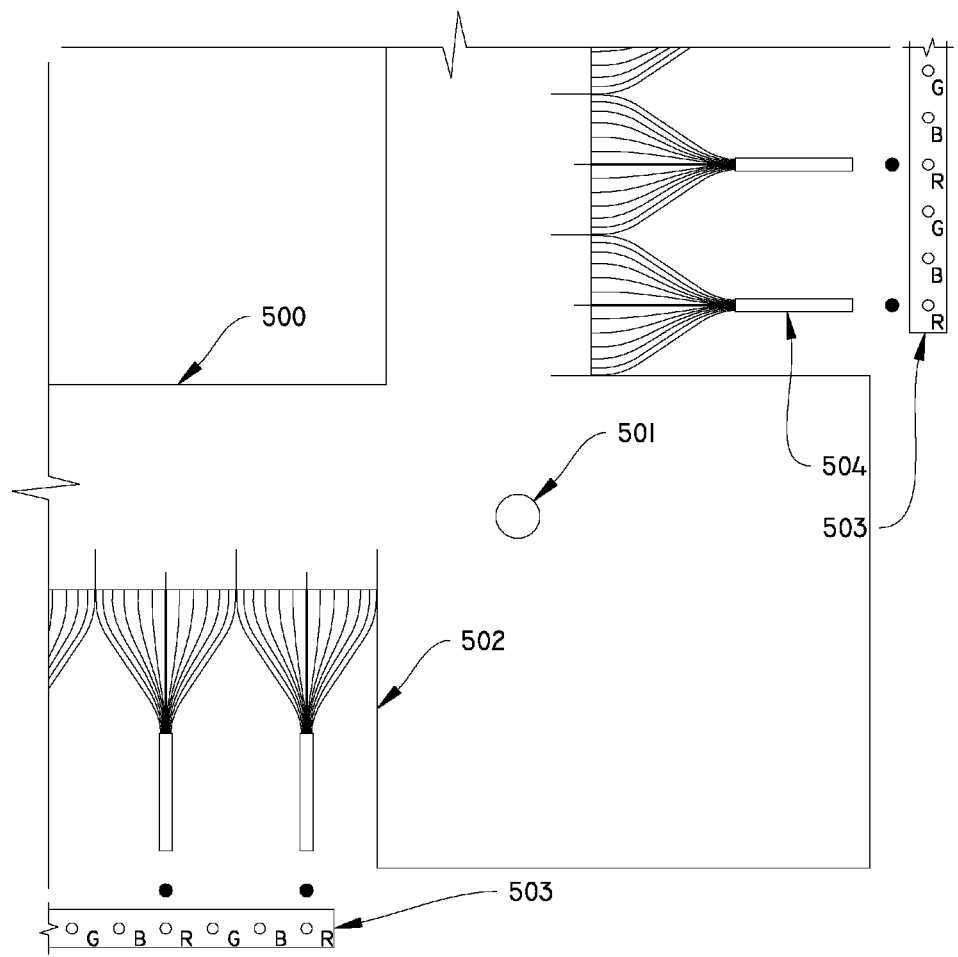
FIG. 5 shows another boundary of an image area, a registration hole, an edge of the sheet 502 bounding individual fiber strands, alternating red (R), green (G) and blue (B) light emitting diode (LED) light strip with individual DMX control channel circuits per color, and a complete fiber optic cable assembly.

FIG. 5 shows another boundary of an image area 500, a registration hole 501, an edge of the sheet 502 bounding individual fiber strands, alternating red (R), green (G) and blue (B) light emitting diode (LED) light strip 503 with individual DMX control channel circuits per color, and a complete fiber optic cable assembly 504.

Figure 6:
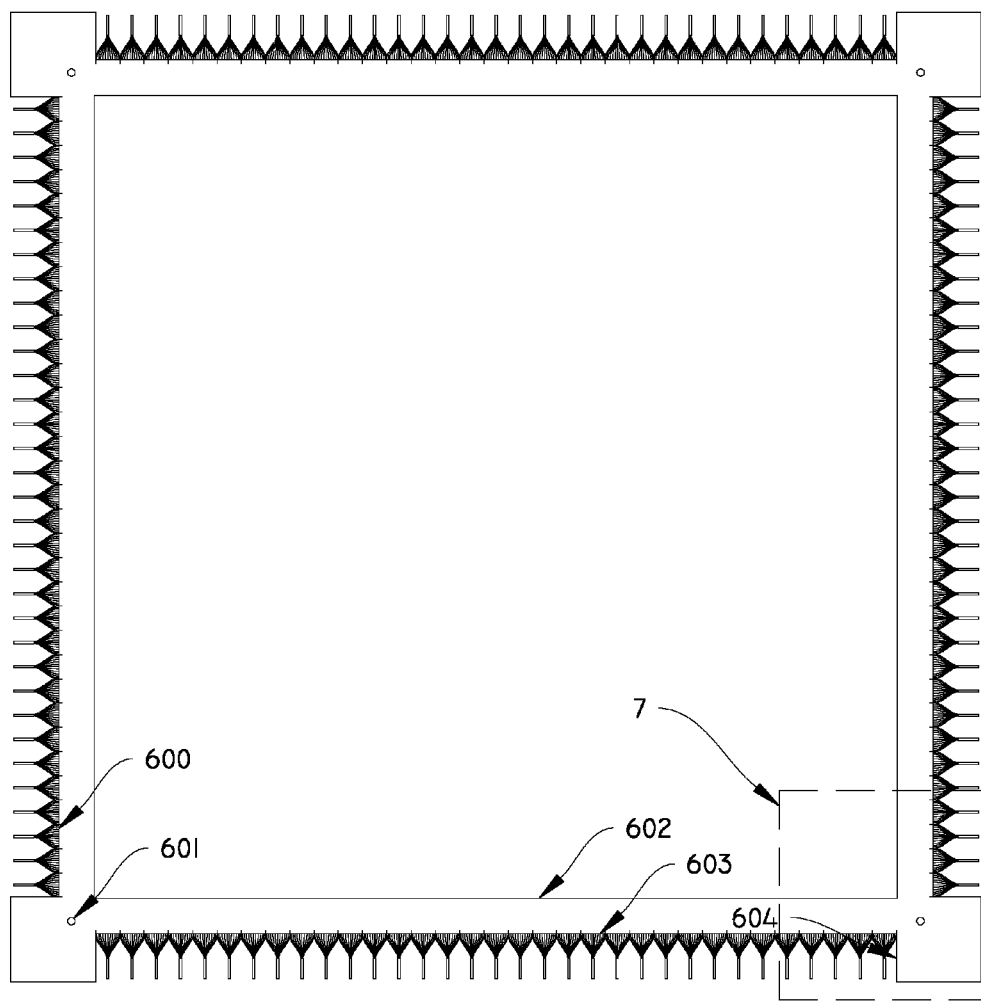
FIG. 6 shows the bundled individual fiber strands in a lightprint sheet of the present technology before they have been bundled.
Figure 7:
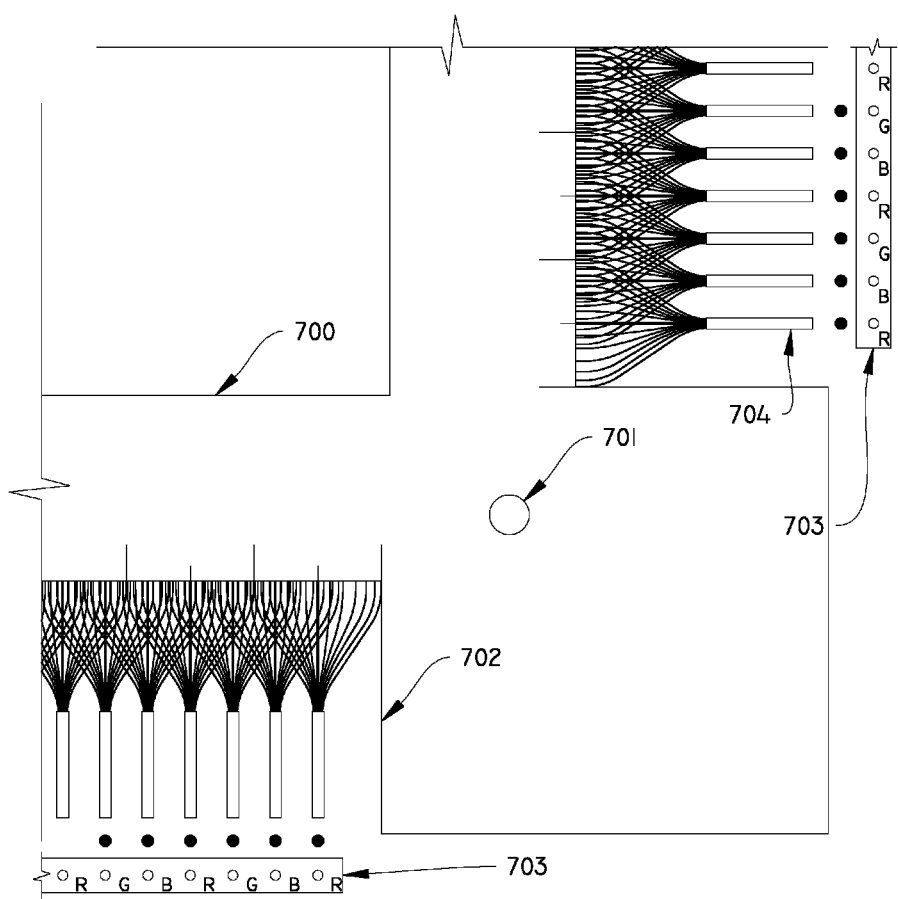
FIG. 7 shows another boundary of an image area, a registration hole, an edge of the sheet bounding individual fiber strands, alternating red (R), green (G) and blue (B) light emitting diode (LED) light strip with individual DMX control channel circuits per color, and a complete fiber optic cable assembly.

FIG. 6 shows the bundled individual fiber strands 600 in a lightprint sheet of the present technology before they have been bundled. There is a registration hole 601 adjacent the edge of the sheet 602. The boundary between separate bundles of fibers 603 is also shown. A quadrant 7 of the combined sheet and fibers is shown including an image area 604 fiber bundles from adjacent sides of the sheet, FIG. 7 shows another boundary of an image area 700, a registration hole 701, an edge of the sheet 702 bounding individual fiber strands, alternating red (R), green (G) and blue (B) light emitting diode (LED) light strip 703 with individual DMX control channel circuits per color, and a complete fiber optic cable assembly 704 with individual fibers emitted from a single cable spreading out to provide light at different image areas.

Figure 8:
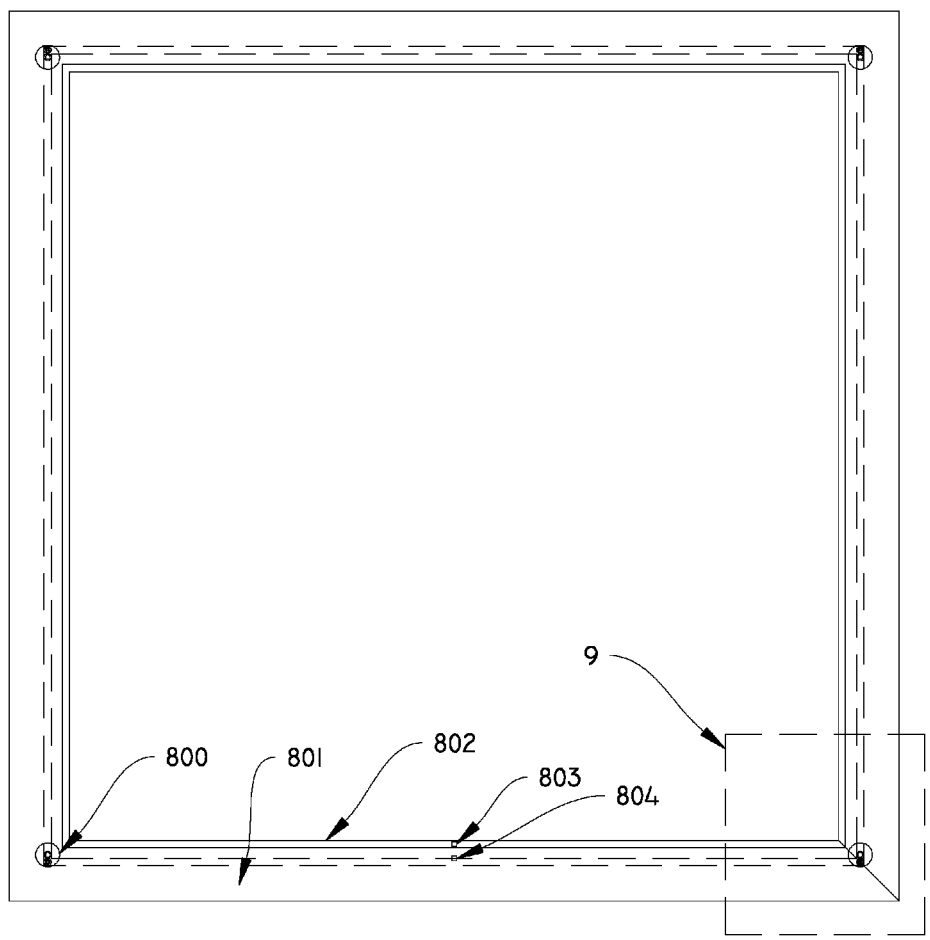
FIG. 8 shows another sheet configuration with registration pin assemblies, a frame assembly, line indicating an edge of the lightprint sheet image area, a red (R), green (G) and blue (B) sensor, and an occupation sensor.

FIG. 8 shows another sheet configuration with registration pin assemblies 800, a frame assembly 801, line 802 indicating an edge of the lightprint sheet image area, a red (R), green (G) and blue (B) sensor 803, an occupation sensor 804 that provides information on the presence or absence of a person(s) in the adjacent viewing area. As with other functional elements, the occupation sensors are in communication with a processor, and the processor may be the same processor that coordinates distribution of power, light, lends control, light gate controls and the like in the imaging functions of the present technology. A designated area 9 is shown in greater detail in FIG. 9.

Figure 9:
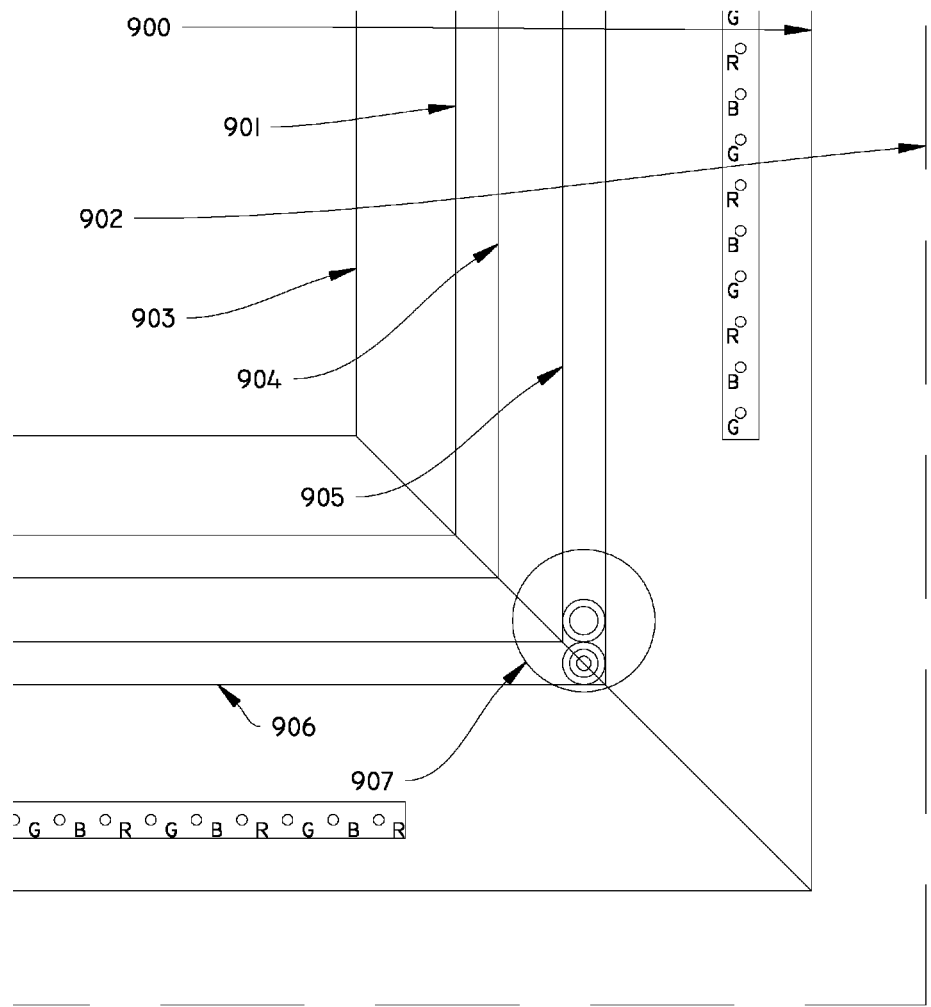
FIG. 9 shows the identified area 9 of FIG. 8. The route of all the wiring through the frame is shown, as is the registration pin assembly.

FIG. 9 shows the identified area 9 of FIG. 8. A far edge of the main extrusion piece encloses a visible inside edge 901 of a top extrusion piece and image area and is within the edge of an estimated original film size 902 prior to laser cutting fiber optic strands and bundling. A visible inside edge 903 of a base extrusion piece is used to support a black backing to provide enhanced contrast with the light image. An angled edge 904 of the top extrusion edge of the frame and a slot 905 for registration discs in the main extrusion piece are shown. The route of all the wiring 906 through the frame is shown, as is the registration pin assembly 907.

Figure 10:
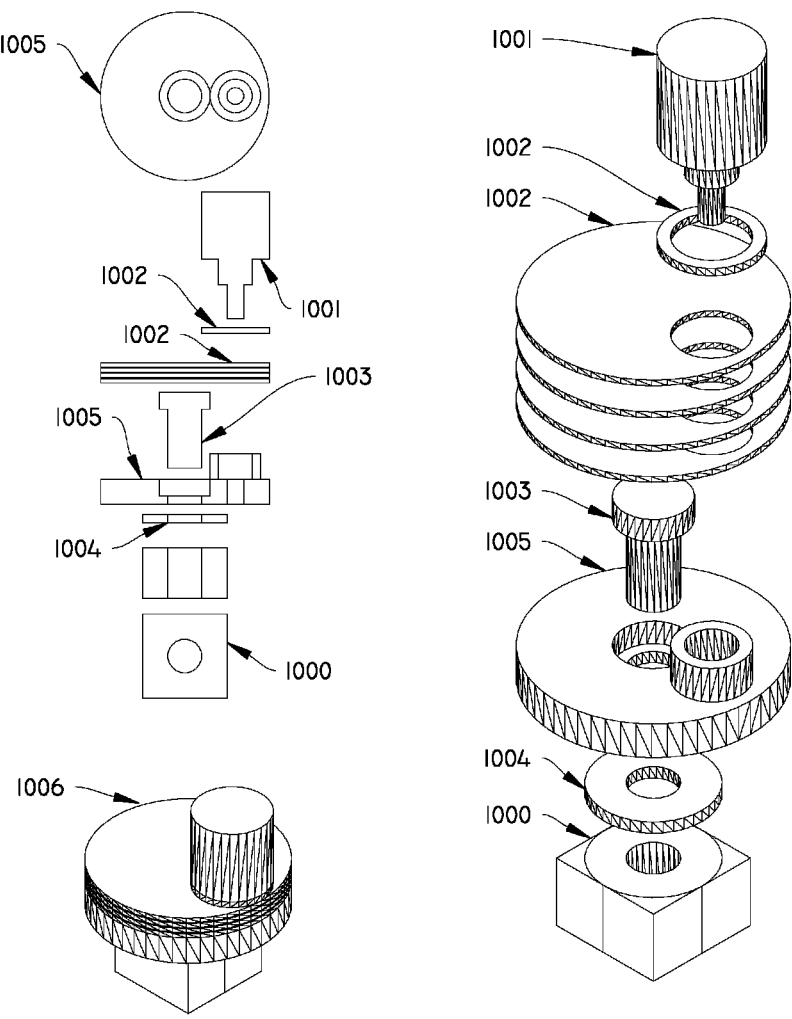
FIG. 10 shows a registration pin assembly as in FIG. 8, including individual components, and exploded view and a perspective view in three-dimensions of an assembled registration pin assembly.

FIG. 10 shows a registration pin assembly 907 as in FIG. 8, including individual components, and exploded view and a perspective view in three-dimensions of an assembled registration pin assembly 1006. A block frame 1000 holds the registration disc 1005 in place, which in turn supports the registration pin 1005. An optional locking system using five spacers 1002 (4 intermediate spacers to separate each of the color carrying/color displaying films and a top spacer) using a set screw 1003 and a washer 1004.

Figure 11:
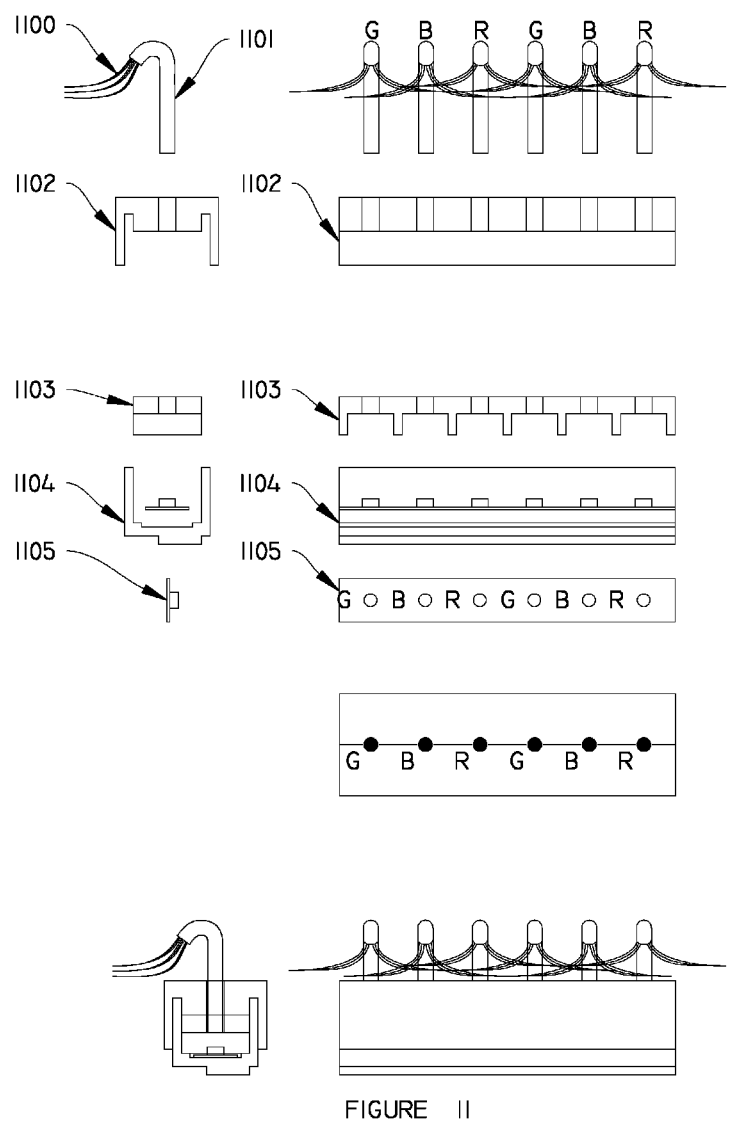
FIG. 11 shows a detailed view of a fiber optic cable lighting assembly including lightprint sheets.

FIG. 11 shows a detailed view of a fiber optic cable lighting assembly including lightprint sheets, 1100 (3) total, each shredded at edge and bundled into fiber optic cables coupled to led nodes, a complete fiber optic cable assembly 1101, fiber optic cables anchor extrusion 1102, that are split down middle, such that the fiber optic cables anchor to the base extrusion 1103 and the LED Base extrusion elements 1104. Also shown is an alternating RGB led light strip with individual dmx control channel circuits per color 1105.

Figure 12:
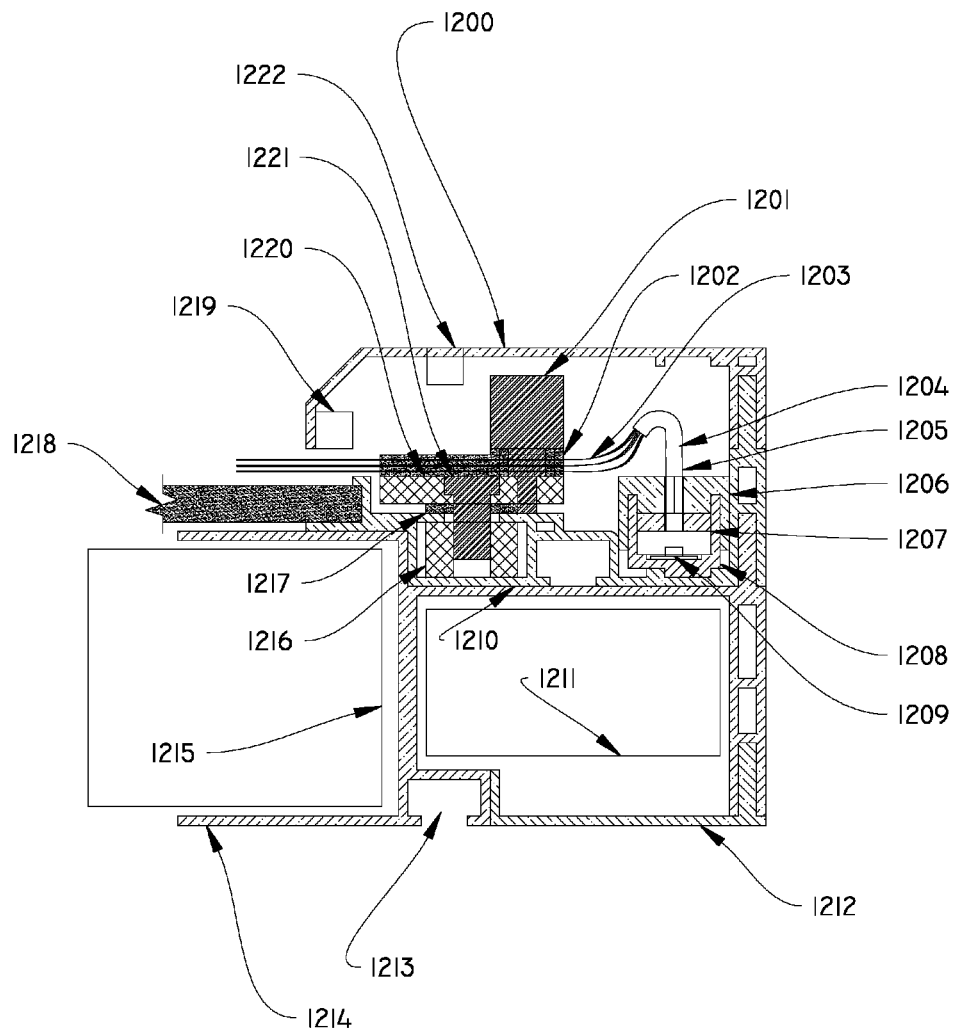
FIG. 12 shows a cross-section view of a complete frame assembly.

FIG. 12 shows a cross-section view of a complete frame assembly. Shown in full assembly are the top extrusion piece 1200, the registration pin 1201, the five spacers 1202 (4) film separation spacers and (1) top spacer. There are three total lightprint sheets 1203 and a lightprint sheet shredded and bundled into fiber optic cables 1204. The complete fiber assembly 1205 of strands is created by laser cutting edge of lightprint sheet, with the film fiber optic cables 1206 anchor extrusion, split down middle so that the fiber optic cables anchor to the base extrusion 1207 and the led base extrusion 1208. Also shown are the alternating rgb led light strip 1209 with individual dmx control channel circuits per color, the main extrusion piece 1210 and a void 1211 for wiring and dmx controller. There is also a base extrusion void cap piece 1212, mounting and frame fastening slot 1213, base extrusion piece 1214, and additional space for power supply 1215. There is a block 1216 in frame to hold registration disc in place, a washer 1217, black, light absorbing material backing 1218 and an RGB sensor 1219. The registration disc 1220, set screw 1221 and occupancy sensor 1222 built into frame and connected to processor are shown in the completely assembled frame assembly.

Figure 13:
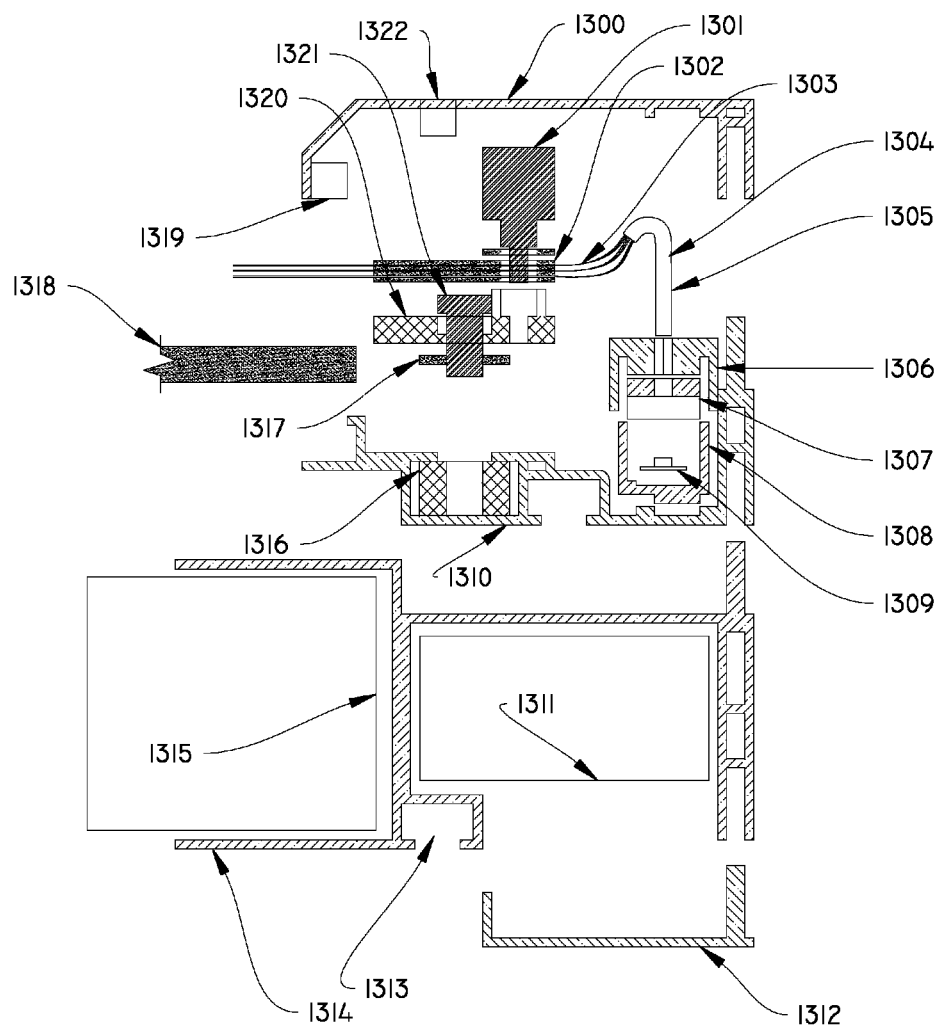
FIG. 13 shows a cross-section view of an exploded frame assembly.

FIG. 13 shows a cross-section view of an exploded frame assembly. Shown in full assembly are the top extrusion piece 1300, the registration pin 1301, the five spacers 1302 (4) film separation spacers and (1) top spacer. There are three total lightprint sheets 1303 and a lightprint sheet shredded and bundled into fiber optic cables 1304. The complete fiber assembly 1305 of strands is created by laser cutting edge of lightprint sheet, with the film fiber optic cables 1306 anchor extrusion, split down the middle so that the fiber optic cables anchor to the base extrusion 1307 and the led base extrusion 1308. Also shown are the alternating rgb led light strip 1309 with individual dmx control channel circuits per color, the main extrusion piece 1310 and a void 1311 for wiring and dmx controller. There is also a base extrusion void cap piece 1312, mounting and frame fastening slot 1313, base extrusion piece 1314, and additional space for power supply 1315. There is a block 1316 in frame to hold registration disc in place, a washer 1317, black, light absorbing material backing 1318 and an RGB sensor 1319. The registration disc 1320, set screw 1321 and occupancy sensor 1322 built into frame and connected to processor are shown in the completely assembled frame assembly.

FIGURE KEY

200 BOUNDARY OF IMAGE AREA
201 REGISTRATION HOLE
202 INDIVIDUAL FIBER STRANDS, BEFORE BUNDLING

203 ALTERNATING RGB LED LIGHT STRIP WITH INDIVIDUAL DMX CONTROL CHANNEL CIRCUITS PER COLOR
204 EDGE VIEW OF INDIVIDUAL FIBER STRANDS
300 BOUNDARY OF IMAGE AREA
301 REGISTRATION HOLE
302 EDGE OF SHEET BOUNDING INDIVIDUAL FIBER STRANDS
303 ALTERNATING RGB LED LIGHT STRIP WITH INDIVIDUAL DMX CONTROL CHANNEL CIRCUITS PER COLOR
304 INDIVIDUAL FIBER STRANDS BUNDLED TOGETHER
400 BOUNDARY OF IMAGE AREA
401 REGISTRATION HOLE
402 EDGE OF SHEET BOUNDING INDIVIDUAL FIBER STRANDS
403 ALTERNATING RGB LED LIGHT STRIP WITH INDIVIDUAL DMX CONTROL CHANNEL CIRCUITS PER COLOR.
404 CLADDING ENCOMPASSING INDIVIDUAL FIBER STRANDS
500 BOUNDARY OF IMAGE AREA
501 REGISTRATION HOLE
502 EDGE OF SHEET BOUNDING INDIVIDUAL FIBER STRANDS
503 ALTERNATING RGB LED LIGHT STRIP WITH INDIVIDUAL DMX CONTROL CHANNEL CIRCUITS PER COLOR.
504 COMPLETE FIBER OPTIC CABLE ASSEMBLY.
600 COMPLETE FIBER OPTIC CABLE ASSEMBLY.
601 REGISTRATION HOLE
602 BOUNDARY OF IMAGE AREA
603 INDIVIDUAL FIBER STRANDS
604 EDGE OF LIGHTPRINT SHEET
700 BOUNDARY OF IMAGE AREA
701 REGISTRATION HOLE
702 EDGE OF SHEET BOUNDING INDIVIDUAL FIBER STRANDS
703 ALTERNATING RGB LED LIGHT STRIP WITH INDIVIDUAL DMX CONTROL CHANNEL CIRCUITS PER COLOR.
704 COMPLETE FIBER OPTIC CABLE ASSEMBLY.
800 REGISTRATION PIN ASSEMBLY
801 FRAME ASSEMBLY
802 EDGE OF LIGHTPRINT SHEET IMAGE AREA
803 RGB SENSOR
804 OCCUPANCY SENSOR
805 DETAILED AREA FOR FIG. 9
900 FAR EDGE OF MAIN EXTRUSION PIECE
901 VISIBLE INSIDE EDGE OF TOP EXTRUSION PIECE AND IMAGE AREA BOUNDARY
902 EDGE OF ORIGINAL FILM SIZE PRIOR TO LASER CUTTING FIBER OPTIC STRANDS AND BUNDLING
903 INSIDE EDGE OF BASE EXTRUSION PIECE SUPPORTING BLACK BACKING
904 ANGLED EDGE OF TOP EXTRUSION PIECE
905 SLOT FOR REGISTRATION DISCS IN MAIN EXTRUSION PIECE
906 ROUTE ALL WIRING THROUGH FRAME
907 REGISTRATION PIN ASSEMBLY
1000 BLOCK IN FRAME TO HOLD REGISTRATION DISC IN PLACE
1001 REGISTRATION PIN
1002 (4) SPACERS, (1) TOP SPACER
1003 SET SCREW
1004 WASHER
1005 REGISTRATION DISC
1006 COMPLETE REGISTRATION PIN ASSEMBLY IN 3D
1100 LIGHTPRINT SHEETS, (3) TOTAL, EACH SHREDDED AT EDGE AND BUNDLED INTO FIBER OPTIC CABLES COUPLED TO LED NODES
1101 COMPLETE FIBER OPTIC CABLE ASSEMBLY
1102 FIBER OPTIC CABLES ANCHOR EXTRUSION, SPLIT DOWN MIDDLE.
1103 FIBER OPTIC CABLES ANCHOR BASE EXTRUSION.
1104 LED BASE EXTRUSION
1105 ALTERNATING RGB LED LIGHT STRIP WITH INDIVIDUAL DMX CONTROL CHANNEL CIRCUITS PER COLOR.
1200 TOP EXTRUSION PIECE
1201 REGISTRATION PIN
1202 (4) SPACERS, (1) TOP SPACER
1203 LIGHTPRINT SHEETS, 3 TOTAL.
1204 LIGHTPRINT SHEET SHREDDED AND BUNDLED INTO FIBER OPTIC CABLES.
1205 COMPLETE FIBER ASSEMBLY OF STRANDS CREATED BY LASER CUTTING EDGE OF LIGHTPRINT SHEET.
1206 FILM FIBER OPTIC CABLES ANCHOR EXTRUSION, SPLIT DOWN MIDDLE.
1207 FIBER OPTIC CABLES ANCHOR BASE EXTRUSION
1208 LED BASE EXTRUSION
1209 ALTERNATING RGB LED LIGHT STRIP WITH INDIVIDUAL DMX CONTROL CHANNEL CIRCUITS PER COLOR.
1210 MAIN EXTRUSION PIECE
1211 VOID FOR WIRING AND DMX CONTROLLER
1212 BASE EXTRUSION VOID CAP PIECE
1213 MOUNTING AND FRAME FASTENING SLOT
1214 BASE EXTRUSION PIECE
1215 ADDITIONAL SPACE FOR POWER SUPPLY
1216 BLOCK IN FRAME TO HOLD REGISTRATION DISC IN PLACE
1217 WASHER
1218 BLACK, LIGHT ABSORBING MATERIAL BACKING
1219 RGB SENSOR
1220 REGISTRATION DISC
1221 SET SCREW
1222 OCCUPANCY SENSOR BUILT INTO FRAME AND CONNECTED TO PROCESSOR
1300 TOP EXTRUSION PIECE
1301 SET SCREW THROUGH REGISTRATION POINT
1302 (4) SPACERS, (1) TOP SPACER
1303 LIGHTPRINT SHEETS, (3) TOTAL.
1304 LIGHTPRINT SHEET SHREDDED AND BUNDLED INTO FIBER OPTIC CABLES.
1305 COMPLETE FIBER ASSEMBLY OF STRANDS CREATED BY LASER CUTTING.
1306 FILM FIBER OPTIC BUNDLES ANCHOR EXTRUSION, SPLIT DOWN MIDDLE.
1307 FIBER OPTIC BUNDLES ANCHOR BASE EXTRUSION
1308 LED BASE EXTRUSION
1309 ALTERNATING RGB LED LIGHT STRIP WITH INDIVIDUAL DMX CONTROL CHANNEL CIRCUITS PER COLOR.
1310 MAIN EXTRUSION PIECE
1311 VOID FOR WIRING AND DMX CONTROLLER
1312 BASE EXTRUSION VOID CAP PIECE

1313 MOUNTING AND FRAME FASTENING SLOT
1314 BASE EXTRUSION PIECE
1315 ADDITIONAL SPACE FOR POWER SUPPLY
1316 BLOCK IN FRAME TO HOLD REGISTRATION DISC IN PLACE
1317 WASHER
1318 BLACK, LIGHT ABSORBING MATERIAL BACKING
1319 RGB SENSOR
1320 REGISTRATION DISC
1321 SET SCREW
1322 OCCUPANCY SENSOR BUILT INTO FRAME AND CONNECTED TO PROCESSOR

A full frontal view of a display screen might show four registration pins. The display screen would have a four-sided frame that surrounds the multilayer color sheets. The light-piping feeds colored light into the films at the side of the frame. The registration pins are shown with two pins adjustable on the top edge of the frame and two pins adjustable on the bottom edge of the frame. The registration pins can be adjusted up and down from the frame and can be moved parallel to at least the adjacent edges and possibly perpendicularly to those edges. The registration disc may also be rotated to further adjust the location of the registration pin. By raising or lowering the registration pins, the composite light-print sheets may be properly aligned. Also shown on the top edge is a color sensor system particularly a sensor system that can measure at least the respective intensities of the individual colors (e.g., red, green and blue) piped into the color sheets. Since the emission intensity of the light emitters (not shown, e.g., LEDs) that generate light fed into the light-piping network tend to weaken or diminish over time, it is desirable to monitor the output intensity so that a display controller (e.g., processor) can adjust energy input to the light emitters to maintain a consistent observable image intensity. The sensor system may either continually monitor or periodically sample (at fixed or random intervals) the intensity of each individual color, two individual colors, one individual color and/or the composite color (white light) output in the sampled region. The processor can execute code with this sensed information to determine which color(s) are diminishing in intensity and send a signal controlling the light emitter outputs. The sensor system and processor thus act as an automated controller for both the light balance and light intensity. Both the balance (relative intensity of each color) and the total output intensity can be controlled. The patch or sample area may have intermittent test signals sent, or the color input signal may be processed (data analyzed) by the processor and compared to the color output signal read by the sensor system. The determined deficiencies in the output signals will then be adjusted by the processor.

A registration pin comprising a positioning plate, a registration post for positioning in and grasping film (not shown) through a registration hole (not shown) in the color film (not shown). By turning clockwise (tightening) or counterclockwise (loosening) the screw in the registration pin, the light transporting films (not shown) may be elevated or lowered, and by sliding pin along the channel, tension in the films may be lessened or increased, and by rotating the registration disc, the relative position of the registration pin can be set, and relative alignment (registration) between the films may be adjusted. The screw threads can move the registration pin up and down in the channel of FIG. 5 and allow the registration pin to slide the entire registration pin along the channel.

Although LED emission is likely the simplest method of providing color light into a distribution network, such as optical fibers, optional and alternative components may also be used. Among other means of introducing light into the individual sheets are any form of collimated light (e.g., lasers with coupling prisms), or a focusing shutter/shield/prism with light emitters (e.g., LEDs, liquid crystals, refracted light) to couple directly to the edge of the sheet.

Although specific dimensions, colors, materials and shapes have been described in the above description, these are mere examples of specifics falling within the generic concepts of the present invention. These specifics should not be read into claims as limitations in the scope of the invention.

What is claimed:

1. A method of displaying an image having multiple colors therein comprising:
   providing at least two overlain imaged light print sheets; wherein each imaged light print sheet comprises a white light transparent sheet having a length, width and depth, and a first viewable surface defined by the width and length and a second surface opposed to the viewable surface defined by the width and length; the length, width and depth of the imaged light print sheet defining a volume;
   a first of the at least two imaged light print sheets having pixels within the volume which alter the direction of white light transmission through the volume such that at least some light intersecting the pixel is directed towards the first viewable surface;
   a second of the at least two imaged light print sheets having pixels within the volume which alter direction of white light transmission through the volume such that at least some light intersecting the pixel is directed towards the first viewable surface;
   the first and second of at least two imaged light print sheets being overlain in a continuous manner; and
   a light of a first visible color is transmitted into the first of the at least two imaged light print sheets, and a second light, of a second visible color different from the first visible color, is transmitted into the second of the at least two imaged light print sheets.

2. The method of claim 1 wherein the method further comprises a third imaged light print sheet overlain with the at least two imaged light print sheets forming a three-sheet, tri-color array; the third imaged light print sheet having pixels within the volume which alter direction of white light transmission through the volume such that at least some light intersecting the pixel is directed towards the first viewable surface; and the first, second and third imaged light print sheets are positioned in a continuous manner; wherein a light, of a first visible color, edge-lights the first of the at least two imaged light print sheets; a second light, of a second visible color different from the first visible color, edge-lights the second of the at least two imaged light print sheets; and wherein a third light, of a third visible color different from the first and second visible colors, edge-lights the third imaged light print sheet.

3. The method of claim 2 wherein at least two three-sheet, tri-color arrays are fixed together in a vertical array, each layer having edge-light thereon.

4. The method of claim 2 wherein the edge lights comprise arrays of optical fibers through which the three visible colors are carried.

5. The method of claim 4 wherein edge lights for each layer are provided with single color light sources.

6. The method of claim 5 wherein the single color light sources comprise monochromatic light.

7. The method of claim 3 wherein the edge lights comprise arrays of optical fibers.

8. The method of claim 7 wherein edge lights for each layer are provided with single color light sources.

9. The method of claim 3 wherein the edge-lights are either continuously lit to provide a 3-dimensional effect, or each three-sheet, tri-color array is separately lit to provide a visual effect of image movement or other visible change.

10. A display system for viewing an image having multiple colors therein comprising at least two contiguous imaged light print sheets; wherein each imaged light print sheet comprises a white light transparent sheet having a length, width and depth, and a first viewable surface defined by the width and length and a second surface, opposed to the viewable surface, defined by the width and length; the length, width and depth of the imaged light print sheet defining a volume; a first of the at least two imaged light print sheets having pixels within the volume which alter direction of white light transmission through the volume such that at least some light intersecting the pixel is directed towards the first viewable surface; a second of the at least two imaged light print sheets having pixels within the volume which alter direction of white light transmission through the volume such that at least some light intersecting the pixel is directed towards the first viewable surface; the first and second of the at least two imaged light print sheets overlain with respective pixels of a single composite image in registry; wherein a light emitter of a first visible color is positioned to edge-light the first of the at least two imaged light print sheets, and a second light emitter, of a second visible color different from the first visible color, is positioned to edge-light the second of the at least two imaged light print sheets.

11. The system of claim 10 further comprising a third imaged light print sheet overlain with the at least two imaged light print sheets; the third imaged light print sheet having pixels within the volume which alter direction of white light transmission through the volume such that at least some light intersecting the pixel is directed towards the first viewable surface; and the first, second and third imaged light prints are positioned in registry with each other; wherein a light emitter, of a third visible color different from the first and second visible color, is positioned to edge-light the third imaged light print sheet.

12. The method of claim 10 wherein at least two three-sheet tri-color arrays are fixed together in a vertical array, each layer having edge-light thereon.

13. The method of claim 12 wherein the edge lights comprise arrays of optical fibers.

14. The method of claim 13 wherein edge lights for each layer are provided with single color light sources.

15. The method of claim 14 wherein the single color light sources comprise monochromatic light.

16. The method of claim 11 wherein the edge lights comprise arrays of optical fibers.

17. The method of claim 16 wherein edge lights for each layer are provided with single color light sources.

18. The system of claim 10 wherein the at least two contiguous imaged light print sheets are secured to a support frame.

19. The system of claim 18 wherein at least one of the at least two contiguous imaged light print sheets is removably secured to the support frame through a registration pin secured to the frame, the registration pin having a post that passes through a registration hole on at least one of the at least two contiguous imaged light print sheets.

20. The system of claim 11 wherein the at least two contiguous imaged light print sheets are secured to a support frame, and wherein at least one of the at least two contiguous imaged light print sheets is removably secured to the support frame through a registration pin secured to the frame, the registration pin having a post that passes through a registration hole on at least one of the at least two contiguous imaged light print sheets.

* * * * *